United States Patent [19]

Hinds

[11] Patent Number: 4,642,539
[45] Date of Patent: Feb. 10, 1987

[54] TORQUE MOTOR WITH UNLIMITED ANGULAR EXCURSION

[75] Inventor: Walter E. Hinds, Beverly Hills, Calif.

[73] Assignee: Northern Magnetics, Inc., Van Nuys, Calif.

[21] Appl. No.: 742,931

[22] Filed: Jun. 10, 1985

[51] Int. Cl.⁴ .............................................. H02K 29/10
[52] U.S. Cl. .................................... 318/439; 318/254; 318/138; 310/68 R
[58] Field of Search ................. 318/138, 254 A, 254, 318/439, 725; 310/68 R, 156, 180, 184, 216, 267

[56] References Cited

U.S. PATENT DOCUMENTS

| | | | |
|---|---|---|---|
| 2,823,545 | 2/1958 | Bodge | 310/184 X |
| 3,344,325 | 9/1967 | Sklaroff | 310/156 X |
| 3,482,126 | 12/1969 | Bradley | 310/156 X |
| 3,501,655 | 3/1970 | Siefert | 318/254 X |
| 3,564,370 | 2/1971 | Catherin | 318/439 X |
| 4,373,148 | 2/1983 | Gutz | 318/138 X |
| 4,547,713 | 10/1985 | Langley et al. | 310/68 R X |

FOREIGN PATENT DOCUMENTS

| | | | |
|---|---|---|---|
| 53-89912 | 8/1978 | Japan | 310/156 |
| 55-160964 | 12/1980 | Japan | 310/180 |
| 56-121360 | 9/1981 | Japan | 318/254 |

Primary Examiner—William M. Shoop, Jr.
Assistant Examiner—Bentsu Ro
Attorney, Agent, or Firm—Bogucki, Scherlacher, Mok & Roth

[57] ABSTRACT

A bidirectional DC motor having a rotatable permanent magnet rotor structure within a ring core bearing helical windings is arranged to provide smoothly continuous torque over very wide excursion angles, which may be continuous if desired. Signals as to actual angular position of the rotor are utilized to generate timing signals for switching a driving current in proper polarity between different windings such that the extent and force of interaction fields remain substantially constant. The windings occupy different arc segments on the ring core and are energized such that all rotor tip regions are uniformly acted upon as the rotor moves from one arc segment to another.

14 Claims, 7 Drawing Figures

| θ OF ROTOR | SIGNAL POLARITY AT TERMINAL | | | |
|---|---|---|---|---|
| | 60 | 60' | 62 | 62' |
| 45° | 0 | 0 | − | + |
| 135° | − | + | 0 | 0 |
| 225° | 0 | 0 | + | − |
| 315° | + | − | 0 | 0 |

TORQUE MOTOR WITH UNLIMITED ANGULAR EXCURSION

BACKGROUND OF THE INVENTION

This invention relates to electrically actuable devices for positioning members, and particularly to torque motor devices for controlling elements in high speed mechanisms such as computer peripheral devices.

The so-called torque motor or limited angle torquer comprises a permanently magnetized rotor member and a concentric torodial ring about which helical windings are disposed. The rotor member is a two or four pole member on a central rotatable shaft. When current passes through turns of the coils adjacent to the pole tips of the rotor, the rotor is subjected to net torque in one direction or the opposite due to what is known as the Lorenz force. The Lorenz force is that relative force resulting from the interaction between a magnetic field and a current within a conductor. In the torque motor it is usually preferred to have uniform windings and a constant air gap, and to provide torque generating forces at both ends of the rotor. Two windings may be wound in opposite senses on the different halves of the ring core, so that when energized with the same signal current Lorenz forces act in the same rotational sense with oppositely magnetized ends of the rotor. The level of the torque is a function of the amplitude of the energizing current and is constant, if the windings and gap are uniform, until the pole of the rotor encounters turns carrying current that is in a direction to generate opposite torque.

The operative angle for prior art torque motors therefore has been limited to the 180° arc that can be encompassed by a single winding. Moreover, the effective angle of excursion is reduced by the included angle of the rotor pole. The wider the rotor pole the greater the torque due to the consequent increase in interaction region, but the smaller the angle before the rotor leaves the edge of the controlling winding and torque becomes non-linear.

The advantages of this arrangement for high precision, high speed, control systems are many. Because magnetic fields are employed the torque exerted is continuous within an arc of influence, and there is no cogging or ripple effect because the air gap is constant. The shaft is directly driven, and substantial torque can be exerted to give rapid acceleration to a position that is resolvable very precisely, with no theoretical limits on resolution. Also, friction can be minimal, rotor weight and inertia are low, torque-to-inertia ratio is high and the motor is brushless so that low power levels and DC signals can be employed. Consequently these positioners are used in a wide variety of applications, such as arm positioners in random access memories (particularly disk drives for data processors), antenna positioners, scanners, valve controls and a wide variety of other advanced control mechanisms.

The fundamental design problem, however, in the operation of these prior art torque motors is that the angular excursion within which torque is linear is inversely related to torque, when the rotor angle at the pole tips is widened or narrowed. The maximum included angle for the rotor poles is 90°, but this can result in an unacceptably small range of linear operation. Most typically, the angular excursion is limited to about ±60° in most commercial motors of this type. Useful torque levels for rapid response are substantially less, being in the range of ±20° to ±40°, depending on the design. While an intermediate gearing or belt mechanism may sometimes be used to increase the excursion of the controlled device these elements add inertia, require space and can also introduce unacceptable tolerance variations. The torque motor and shaft may be made in a larger size, at greater cost, to provide the needed range of displacements, but again inertia, volume or expense can be unacceptable. There are many instances in which a torque motor is needed that has an unlimited choice of excursion angles and a small size for the particular application.

SUMMARY OF THE INVENTION

A torque motor having unlimited angular excursion for precision applications comprises a stator system including a number of windings each spanning a predetermined arc about a central axis next to which a permanent magnet rotor is rotatable. Dependent on the angular position of the rotor, an energizing current signal is switched through selected combinations of the windings with appropriate senses and times to apply substantially constant torque to the rotor that enables precise positioning of the rotor at any angle as well as unlimited angular excursion if desired. The instantaneous angular position of the rotor is sensed and utilized in conjunction with rotor direction to energize windings in a leading direction such that a continuous magnetic interaction length of coil turns acts upon the rotor. Therefore the motor can utilize a maximum rotor pole angle without being limited in excursion arc.

In a particular example of the invention, a small, wide excursion angle torque motor comprises a two-pole rotor having permanently magnetized diverging pole tips each spanning 90° of arc, together with four helical windings on a concentric radially separated ring core, each winding covering a different quadrant. An angular position encoder is coupled to the rotor shaft and switching signals are generated, dependent on rotor direction, to energize the next windings to be overlapped in the leading direction when the edges of the pole tips are aligned with the limits of the then opposed winding. Windings in opposite quadrants are preferably interconnected but oppositely wound, such that only one terminal pair per pole tip is required. This arrangement enables a small torque motor having low mass and high acceleration to actuate a controlled device (e.g., transducer carriage), through a substantial displacement.

In another example, useful where switching signals are more conveniently generated as three-state signals, with plus, minus and zero levels, four 180° windings are arranged to cover double length arc segments but with 90° overlap on each side relative to adjacent windings. Each pair of two windings on opposite sides of the rotor is serially interconnected but wound in opposite senses. Only one pair of windings is energized at a time, especially when the rotor position reaches a switching point where the rotor is entirely within the span of an arc segment.

In yet another example, the ring core in the stationary stator is configured with flat sides in planes normal to the central axis, and a pair of rotors is employed, one on each side of the ring core. Thus flat lengths of coil turns on both sides of the stator are used in the force generating reaction, substantially increasing further the torque exerted on a common central shaft by the rotors.

Motor drives in accordance with the invention can have four pole rotors, or rotors with other multiples of two, although four poles will be exceeded only in special applications. The number of windings is also correspondingly increased, but the switching principles remain the same.

BRIEF DESCRIPTION OF THE DRAWINGS

A better understanding of the invention may be had from the following description, taken in conjunction with the accompanying drawings, in which.

DETAILED DESCRIPTION OF THE INVENTION

Figure 1:
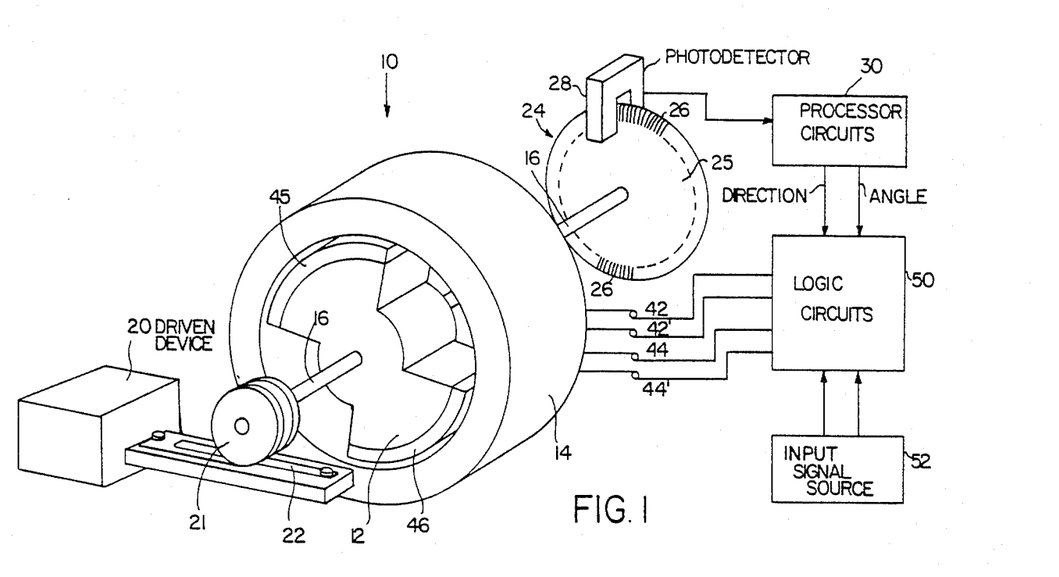
FIG. 1 is a combined simplified perspective and block diagram representation of a motor drive system in accordance with the invention.
Figure 2:
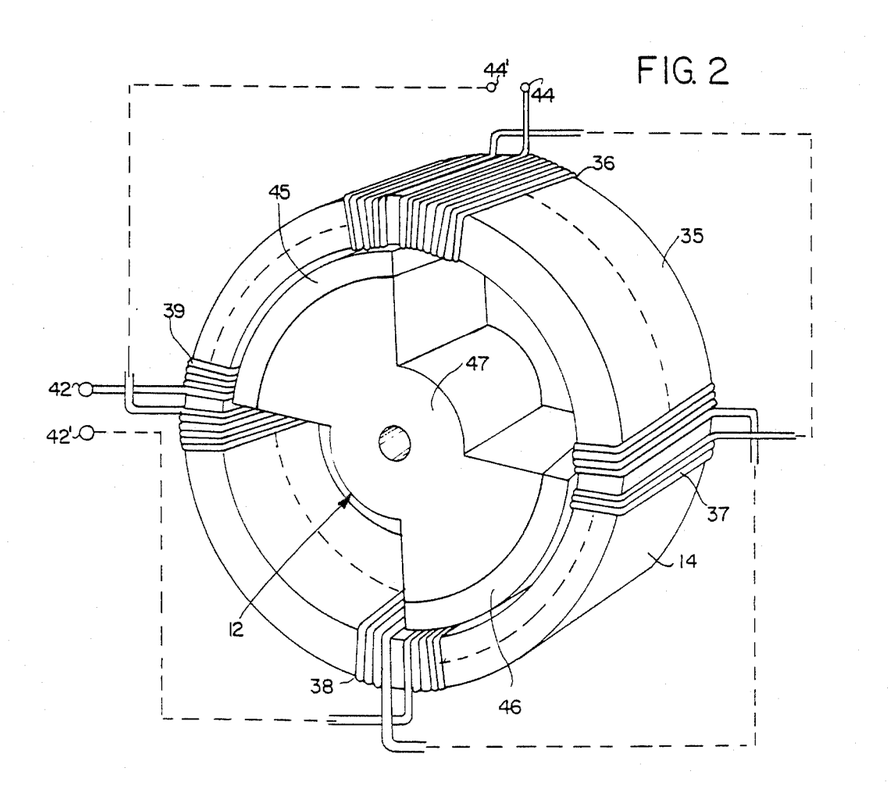
FIG. 2 is a fragmentary perspective view, partially broken away, of a rotor and stator arrangement used in the system of FIG. 1.
Figure 3:
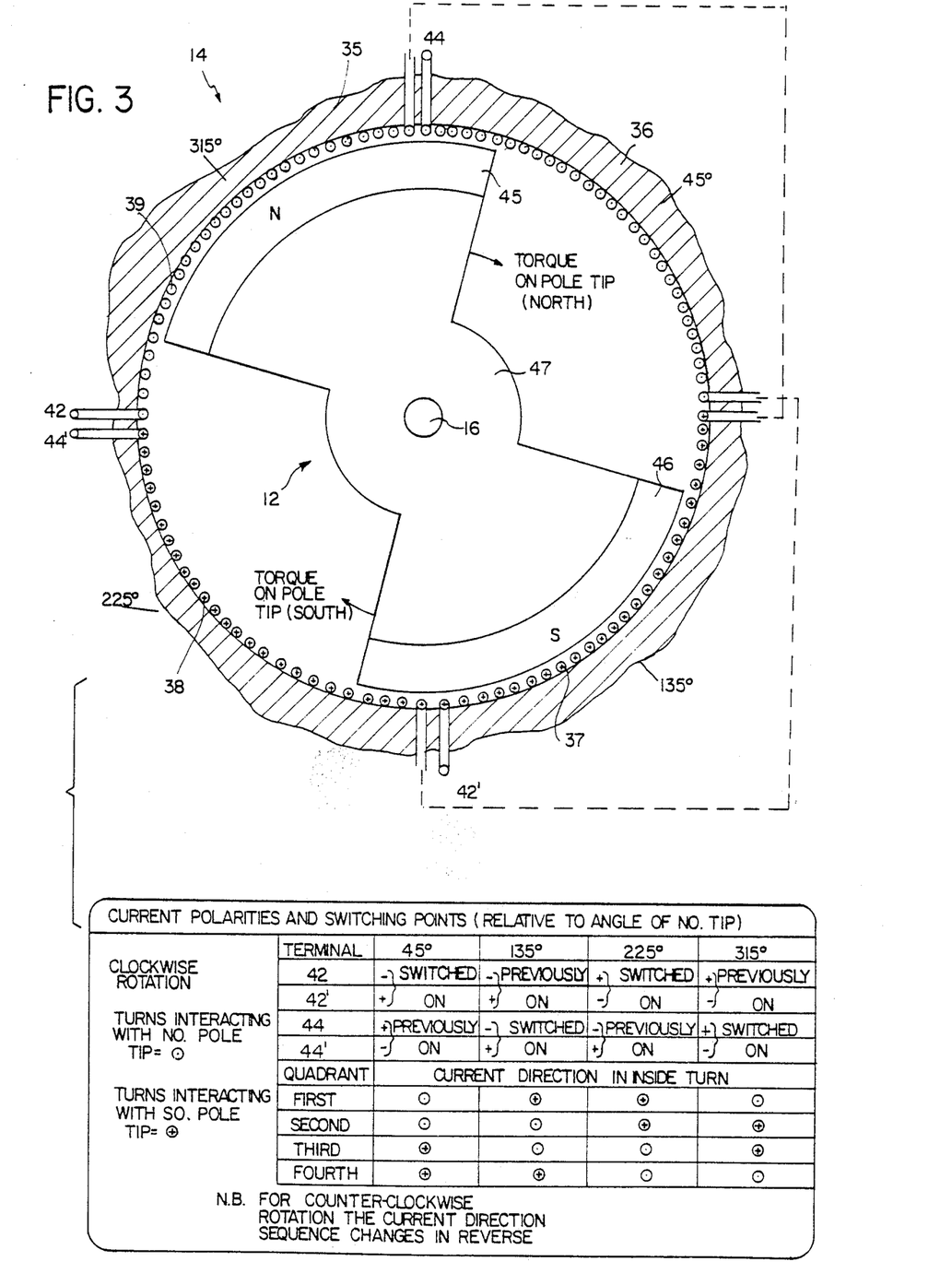
FIG. 3 is a simplified schematic representation and table, showing the signal switching points relative to rotor position in the device of FIGS. 1 and 2.

A controlled torque, universal angle, DC motor drive system in accordance with the invention is depicted in FIGS. 1-3, as utilized in conjunction with a high speed, precision mechanism such as a transducer positioner for a random access disk file. In such systems, fast access time and extremely precise control are both highly desirable, but not readily achieved in combination by prior art devices, except by a large limited angle torque motor that is too bulky and costly. Similarly, many other applications exist in which smooth, linear and cogging-free torquing can be used as the basis for precise and high speed mechanical displacement in a relatively low cost system.

The motor drive system of FIGS. 1-3 comprises a torque motor 10 having a magnetized rotor 12 centrally mounted within a concentric, radially separated stator 14 on a central shaft 16. The shaft 16 is coupled to a driven device 20 such as a transducer carriage for a magnetic disk drive, by a known angular to linear motion translator, here a known capstan 21 and split band 22 arrangement. The relative sizes of the devices are not to scale in order that the motor drive can be more clearly seen. Other devices, such as a rack and pinion or a lead screw arrangement, may be used in this application. Smooth and continuous conversion of shaft 16 rotation to linear movement is desired for this usage, but in other applications of the drive solely rotary motions may be generated. The motor shaft 16 is also coupled to an angle encoder 24, which may comprise a transparent or opaque disk 25 having alternating incremental indicia 26 (shown only generally) of contrasting transmissivity or reflectivity, and a photosensor 28 generating position signals of suitable angle resolution. From the position signals, velocity as well as instantaneous angle can be computed in processor circuits 30 which may be analog or digital. Coarse and fine position signals, and coarse and fine positioning modes, may be employed in any of a number of known combinations.

In the present example, the processor circuits 30 include conventional means for counting the incremental indicia 26, which may be very finely divided (e.g., 1000 increments per revolution) and include a wider index mark (not shown) for indicating a starting point. The processor circuits here include conventional means in hardware or software for counting the pulses and providing timing signals at predetermined angular positions, discussed in more detail below. Alternatively, separate index marks denoting switching points can be included on the disk 25 and sensed by a separate detector (not shown). The processing circuits 30 can also generate actual direction signals, or these can be derived from the input signal or by logic circuits which store information as to the last prior index pulse position. Details are not included since a wide variety of such systems are now known, particularly in digital form.

As better seen in FIG. 2, the motor 10 includes a torque generating device comprising the two pole rotor 12 and the encompassing stator 14, which includes a magnetic ring core 35 concentric with the shaft 16 axis and first through fourth helical coils 36, 37, 38 and 39 respectively, each wound about substantially the full length of a different quadrant on the ring 35. For convenience, the coils may be coupled together in pairs, with the opposing first and third coils 36, 38 being wound in opposite senses and driven from a common pair of terminals 44, 44'. Similarly, the opposing second and fourth coils 37, 39 are oppositely wound about their quadrants and driven in common from a second terminal pair 42, 42'. As seen in the idealized diagram of FIG. 3, a current of given polarity at the first terminal pair 44 passes through the first and third coils 36, 38 to provide magnetic fields of opposite polarities at the gaps between the inner windings of the coils and the pole tips. The fields established about the inside coil wires in a quadrant interact with the permanent field of a pole tip in an interaction gap to exert a torquer force in a direction dependent on the relative polarities of the fields. Only the pole tip area, coextensive with and uniformly spaced from the inner coil turns, is in the interaction region, but torque is constant as long as the number of turns in this area remains the same, and the energizing current remains the same. The torque reverses with current reversal while changes in energizing current level modulate the torque. The rotor 12 here is a two pole magnetic body having high coercity tips 45, 46 of a material such as samarium cobalt. The tips 45, 46 diverge outwardly from a central body portion 47 attached to the shaft to have a 90° included angle from the central axis of the shaft 16.

FIGS. 1 and 3 also show the manner in which input signals from a current source 52 are switched, at varying times and with controlled polarities, to maintain constant torque drive for a given signal amplitude. The terminals of the source 52 may be designated (+) and (−) to show an assumed signal polarity for driving the rotor 12 in a clockwise, here called forward, direction. For reverse direction drive, the polarity relationship of the signals on the two input leads is opposite, as will be understood. The processor circuits 30 here determine the actual direction of movement of the rotor 12 and shaft 16, as well as provide mid-quadrant signals designated as 45°, 135°, 225° and 315° timing signals. These two sets of signals are employed in logic circuits 50 to couple the input signals with or without inversion to the windings 36–39, in accordance with the logic in the Table incorporated as part of FIG. 3.

Referring now particularly to FIG. 3, the rotor 12, when moving in a given direction, encounters torque-contributing effects only from the coil turns in the interaction region. Thus, assume that the rotor 12 is aligned with the north magnetized tip 45 opposite the fourth quadrant coil 39, while moving clockwise. For this movement also assume that current in the turns is to be in the direction out of the paper. Immediately prior to centering of the tip 45 relative to the 315° position, the magnetic field interactions of the North pole tip 45 would be with fields generated by emerging currents from the inner turns of the associated third and fourth quadrant windings 38, 39. Concurrently, the currents in the inner turns of the first and second windings 36, 37 would be penetrating into the paper, giving a like-directed thrust to the South magnetized pole 46. At the time that the rotor 12 north polarized tip 45 is centered on the 315° position, however, the energizing signals are changed. The North pole tip 45 is then leaving the influence of the third winding 38 and beginning to enter under the first winding 36. Consequently, the current that is applied to the first winding 36 is switched, to emerge from the paper, so as to exert clockwise torque on the rotor 12 at the tip 45 as the serially coupled and oppositely disposed third winding 38 is also energized. Moreover, the third winding 38 which is oppositely wound and then directly opposed to the South pole tip 46, also exerts a clockwise force on the rotor 12 through the next 90° of rotation.

The changing excitation conditions are shown in the Table of FIG. 3, and are readily implemented by conventional logic circuits, or by software controlling a signal gating system. The basic rule is that a winding is excited by the energizing current in a sense to impel a desired rotational direction in the rotor for as long as the arc segment spanned by the winding is at least partially coextensive with a rotor tip of a given polarity. Thus, two windings are energized for each pole tip, except at the precise time of switching. One winding provides the then dominant torque (for that pole tip) and the other begins to act on the leading edge of the rotor with increasing torque. If not concerned with redundancy, the logic circuits can comprise, for each winding and direction of rotation, input gates which set a latch for the time that a particular pole is within the area of influence and output gates that reversibly control the polarity of the applied current. Because opposed windings are interconnected and pole tips are symmetrical, only two logic circuits need be employed.

Rotor tips 45, 46 of 90° span are preferred in this example for maximum torque for a given size motor, although lesser angles can also be used for particular applications. With this configuration, each winding 36–39 is switched on, with one signal polarity or the other, during essentially an entire rotor cycle. In most situations, the longitudinal displacement of the drive device will be within predetermined limits, so that a total angular excursions of more than 180° but less than 360° can be used. This merely reduces the gates needed to implement the logic. The switchover of energizing signals from lagging to leading windings need not be undertaken with high precision, because the torque fluctuation is minor as long as the crossover is maintained within a few degrees of arc. In consequence, a high torque characteristic having substantially no falloff at limit positions has been achieved, along with universal excursion angles if desired.

Figure 4:
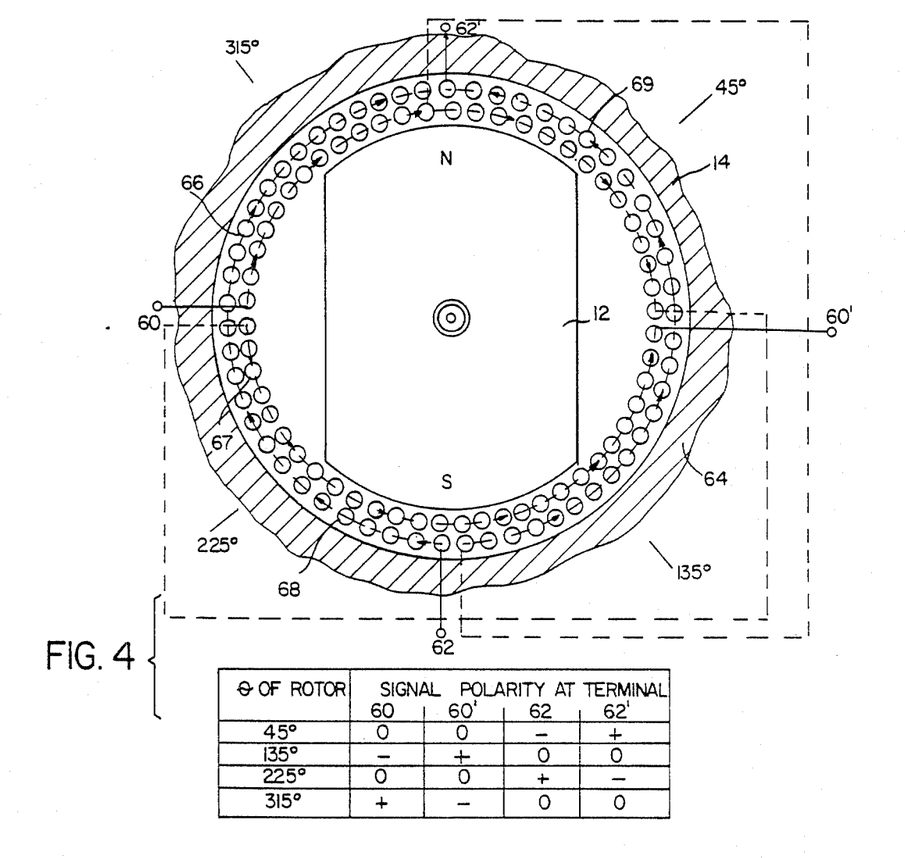
FIG. 4 is a schematic representation and table depicting a different winding and switching arrangement in accordance with the invention.

In another example of a motor drive in accordance with the invention, ripple and cogging free operation is achieved with a different winding arrangement and excitation pattern, as depicted in somewhat idealized form in FIG. 4, which does not show the associated system. Here the rotor 12 is again a two pole element, but the windings 66, 67, 68 and 69 each cover a 180° angle about the ring core 35. The windings 66, 67, 68 and 69 additionally overlap half of each adjacent winding, and opposed winding pairs 66, 67 and 68, 69 respectively are intercoupled serially and wound in opposite senses. The energizing currents are conducted between opposed terminal pairs 60, 60' and 62, 62'. As shown in the Table of FIG. 4, the switching points are at 45°, 135°, 225° and 316° points relative to the position of a predetermined rotor pole within the stator 14. However, only one energizing signal is applied at a time, the excitation change taking place smoothly because the windings are alike and there is no transitional zone.

The windings 66, 67 between terminals 60, 60' each cover half of the ring core 64, and are serially interconnected and oppositely wound as previously described. Windings 68, 69 between terminals 62, 62' are similarly wound and also cover essentially all the ring core 64. Only the inner turns of the coils 66–69 are depicted for simplicity.

Torque is exerted on both ends of the rotor 12 when current is applied to the appropriate terminal pair in the desired sense. The Table of FIG. 4 depicts the polarities and switching times of the applied signals in relation to rotor 12 position for a given direction. Given that the North pole tip of the rotor 12 is torqued clockwise when adjacent the windings 66 or 68, and a + signal is applied to terminal 60 or 62 and a − signal to the associated terminal 60' or 62', the opposite polarity combination is needed for clockwise rotation when the North rotor pole is adjacent the other windings 67 or 69. Thus, as seen in the Table of FIG. 4, switching takes place at each 45° position to energize both the quadrant in which the rotor is then centered during movement, and also the next quadrant to be encountered. Because of the 90° included angle of the pole tips, a constant number of total coil turns is coextensive with the two rotor pole tips (both ends being reactive with the oppositely wound coils) and the torque level is held virtually constant. Switchover in the middle of the next quadrant takes place smoothly and there is no difficulty in positioning the rotor 12 at the switchover point. Furthermore, this approach enables a different type of logic, generating tristate signals (+, −, and 0) to be used for effecting switching.

Figure 5:
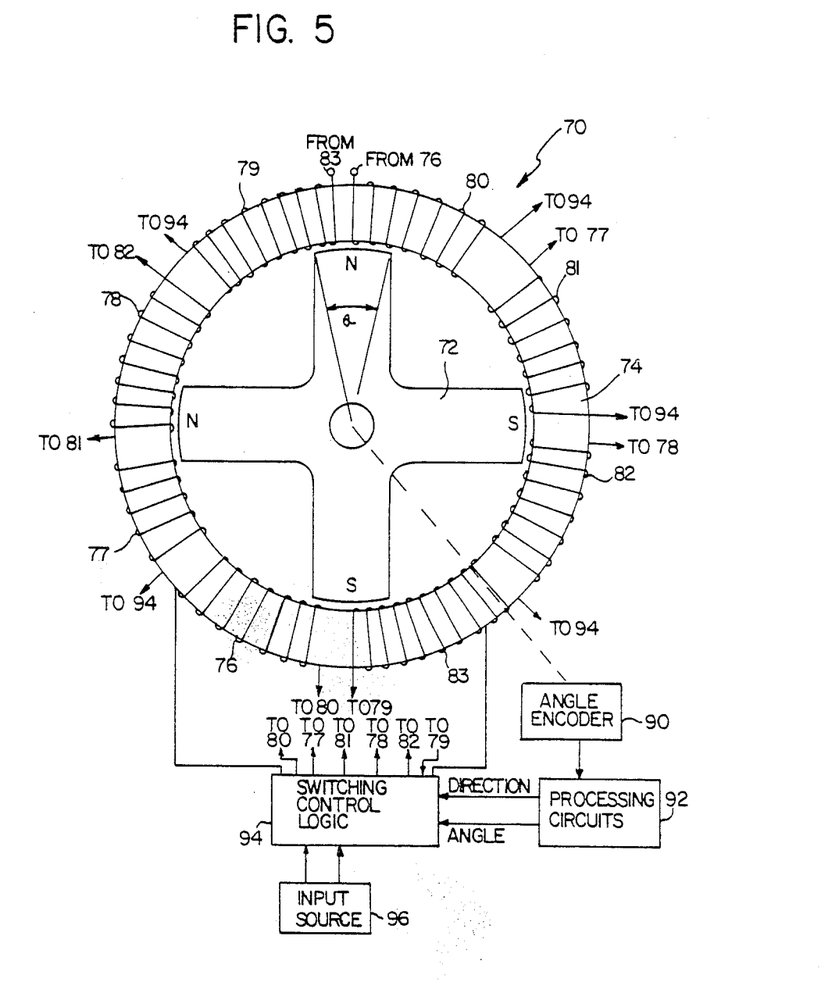
FIG. 5 is a simplified schematic view of a four pole rotor system in accordance with the invention.

The example of FIG. 5 depicts a torque motor 70 having a four pole rotor 72 within a stator 74 having eight like and serially disposed windings 76–83 symmetrically spaced about a ring core 85. Opposite windings are serially coupled in pairs, e.g. 76 and 80, 77 and 81, 78 and 82, and 79 and 83 that are oppositely wound to simplify circuit connections in the manner previously described. An angular encoder 90 provides position signals to processing circuits 92, such as a microprocessor which may perform many other functions, that generate direction and angular position signals for switching control logic 94. Driving signals from an input source 96 are shifted in time and in proper polarity between the different windings 76–83 so as to increase the total angular excursion to any extent desired, including continuous rotation. By using a number of switching points, however, the functional angular limitation of prior four pole torque motors, typically in the range of ±30°, can be vastly exceeded.

It should also be noted from FIG. 5 that the included angle of each rotor 72 tip is substantially less than the maximum 45° that can be utilized. This angle, $\theta$, allows some adjustment in the switching point relative to the position of the rotor 72 with respect to the ends of the energizing windings 76–83. The switching point, for example, can be different, dependent on the direction of rotation, as long as an edge of the rotor 72 does not come under the influence of coil turns which oppose desired movement. Switching points may also be varied in accordance with rotational velocity or desired final rotor position.

Figure 6:
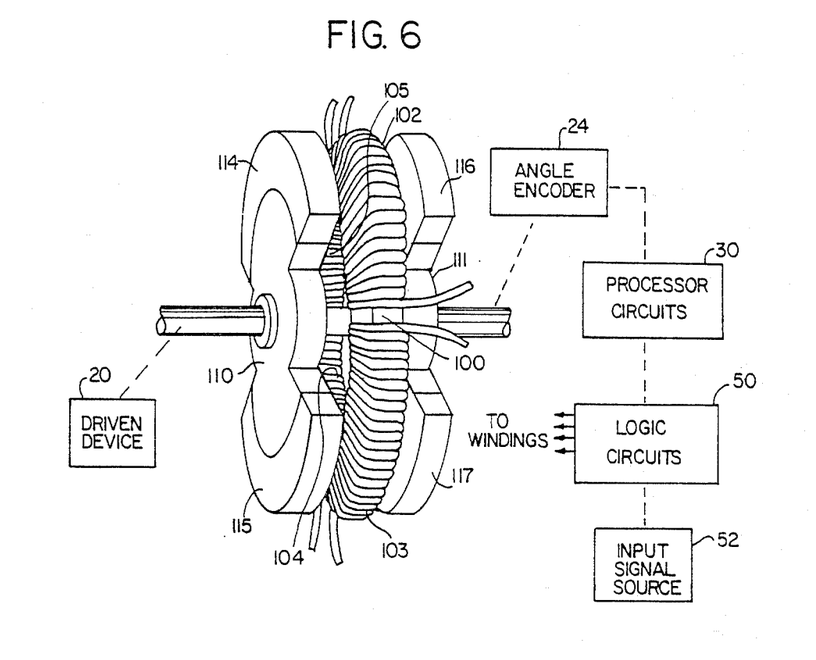
FIG. 6 is a simplified perspective view of a double sided longitudinal flux configuration in accordance with the invention.
Figure 7:
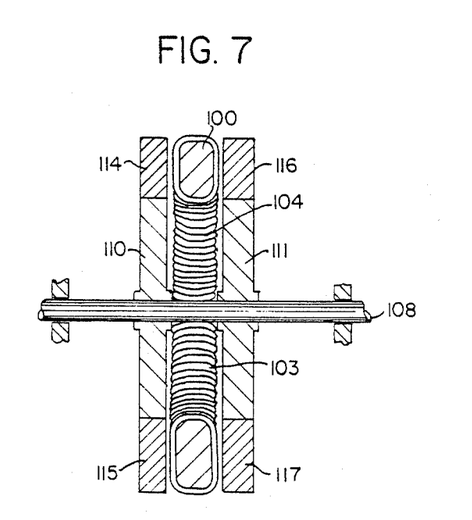
FIG. 7 is a side sectional view of the configuration of FIG. 6.

In another motor drive in accordance with the invention as shown in simplified form in FIGS. 6 and 7, $I^2R$ loss in the coils is minimized and torque is augmented by a double sided longitudinal or axial flux structure. Here, a ring core 100 is helically wound with first to fourth windings 102–105, serially disposed in individual arc quadrants, as in the device of FIGS. 1–3. However, the ring core 100 has flat faces lying in planes orthogonal to a central shaft 108 on which a pair of magnetic rotors 110, 111 are radially mounted. Coil turn lengths that lie on these flat surfaces thus effectively lie in different planes at fixed gap distances from the sides of the rotors 110, 111. Flat sided permanent magnets 114, 115 and 116, 117 are incorporated in opposite polarity pairs in the rotors 110, 111, respectively, coextensive with at least the major portion of the opposing linear coil segment. The permanent magnets 114–117 span, in the circumferential direction, 90° of arc so as to provide maximum interaction regions with fixed gap spacings from the coil turns. The associated devices and circuits for switching the energizing currents between the windings 102–105 may be as described in connection with FIGS. 1–3, and need not be further described.

In this longitudinal flux structure interaction between currents in the windings 102–105 on the stationary core 100 and the magnets 114–117 on the rotors 110, 111, generate Lorenz forces on the rotor magnets 114–117 to turn the shaft 108. The juxtaposition of rotor tips adjacent both opposite sides of the windings 102–105 doubles the interaction area and the torque. With 90° included angles at the rotor tips 114–117 and by switching between successive windings in accordance with the invention, a superior combination of torque and excursion angle is achieved.

It will be evident to those skilled in the art that the rotor magnets on opposite sides of a core segment are chosen to be of opposite magnetization so that the two rotors are both torqued in the same direction for a given energizing current. It will also be understood that longitudinal flux torque motors in accordance with the invention can be single sided, where space, size or other considerations make this advantageous.

While various forms and modifications have been described above and illustrated in the drawings, it will be appreciated that the invention is not limited thereto but encompasses all variations and expedients within the scope of the appended claims.

What is claimed is:
1. A torque motor drive system providing continuous torque through angles greater than 180° to arrive at precisely defined angular positions by current control, comprising:
   a ring core of magnetic material concentric with a central axis;
   a rotor having at least two pole tips and rotatable about the central axis adjacent the ring core, the rotor being of magnetic material and including permanent magnet means opposed to the ring core;
   coil means including a number of windings disposed in arc segments along the ring core, the windings being helically wound about the respective arc segments of the ring core and the rotor pole tips having an included angle from the central axis that is not greater than the arc segments of the windings;
   signal means providing a driving current of variable amplitude to the coil means for controlling rotor movement;
   encoder means coupled to the rotor for indicating the instantaneous position thereof; and
   switching means responsive to the encoder means and coupled to the signal means for switching the driving current to different windings in accordance with rotor angular position and direction, the switching taking place when front edges of the pole tips of the rotor are in a midregion of an arc segment such that the next windings in the direction of rotation are energized to provide a substantially constant number of lengths of the windings energized in appropriate senses directly opposite the pole tips as the rotor turns.

2. The invention as set forth in claim 1 above, wherein the windings of opposite arc segments are serially coupled together and wound in opposite directions about the ring core.

3. The invention as set forth in claim 2 above, wherein there are twice as many windings as pole tips and wherein the pole tips are approximately equal to the arc segments.

4. The invention as set forth in claim 3 above, wherein the rotor has two pole tips each having a periphery with an included angle of about 90° and the coil means includes four non-overlapping arc segments of about 90° each.

5. The invention as set forth in claim 4 above, wherein the rotor includes a pair of permanent magnet pole tips and the rotor diverges outwardly from a central region to the pole tips, and wherein the ring core is concentric about the rotor such that a uniform radial gap exists between the outer periphery of the pole tips and the adjacent lengths of the coil turns.

6. The invention as set forth in claim 3 above, wherein the rotor has four pole tips and wherein the coil means includes eight windings.

7. The invention as set forth in claim 3 above, wherein the ring core and coil means include lengths of coil turns lying in a plane transverse to the central axis, and wherein the rotor is spaced apart from such lengths of coil turns with a uniform spacing in a direction parallel to the central axis.

8. The invention as set forth in claim 7 above, wherein the ring core includes lengths of coil turns lying in two planes transverse to the central axis on opposite sides of the ring core, and wherein the rotor comprises a pair of rotors on opposite sides of the ring core and each including a pair of permanent magnets spaced apart from the adjacent lengths of coil turns with uniform spacings and arranged with polarities to exert torque on the shaft in a given direction for a given driving current.

9. The invention as set forth in claim 1 above, wherein the windings of successive arc segments overlap and each covers an arc equal to that portion of a complete circle swept by an individual pole tip when all pole tips together have cumulatively swept the complete circle, and wherein the windings are energized in alternating fashion.

10. The invention as set forth in claim 9 above, wherein the rotor has two pole tips and wherein the windings comprise four windings, each covering 180° of arc in four quadrants, with overlap along 90° of arc with each of two adjacent windings, and wherein the opposing windings are serially coupled together and wound on the core in opposite senses.

11. A brushless bidirectional DC torque motor drive having an essentially unlimited excursion range within which the motor can be angularly positioned and a high level of uniform torque for an applied driving current, comprising:
  a magnetic rotor including a shaft rotatable about a central axis, the rotor having at least two pole tips, oppositely and permanently magnetized, extending radially from the central axis and each covering a predetermined arc about the central axis;
  a magnetic ring core concentric with the central axis and disposed adjacent the rotor with a uniform gap from the pole tips;
  a set of helical windings wound about the ring core with lengths of winding adjacent the pole tips and transverse to the direction of movement of the pole tips in rotation of the rotor, each set of windings being disposed along an arc segment at least equal to the arc of the pole tips; and
  means coupled to the windings and providing a driving current of selectable amplitude and including switching means responsive to the angular position of the core to energize the windings in different patterns in relation to the desired amplitude and direction of torque to be exerted and in relation to the angular position of the rotor relative to the ring core, such that a substantially uniform interaction force is exerted on the pole tips and rotor due to current in the lengths of windings regardless of the position of the rotor.

12. The invention as set forth in claim 11 above, wherein the rotor pole tips are equal in number to some multiple of two, and wherein the included angle of each pole tip is approximately equal to 360°/2 divided by the number of pole tips.

13. The invention as set forth in claim 12 above, wherein the helical windings are disposed serially on the ring core to provide a substantially continuous sequence of turns in interactive relation with the rotor, and wherein the means to energize the windings comprises means for switching between windings to maintain a substantially constant number of energized coil turns in interactive relation with the rotor pole tips.

14. The invention as set forth in claim 13 above, wherein the means to energize includes means for providing bipolar drive signal, and wherein the switching means comprises means responsive to the bipolar drive signals for switching the polarity of the windings.

* * * * *